United States Patent [19]

Garin, III et al.

[11] Patent Number: 5,197,559
[45] Date of Patent: Mar. 30, 1993

[54] FOLDABLE WHEELCHAIR WITH OPTIONAL POWER OR MANUAL DRIVE

[75] Inventors: Paul V. Garin, III, Clovis; Donald E. Lusk, Fresno, both of Calif.

[73] Assignee: Fortress Life-Style, Inc., Calif.

[21] Appl. No.: 579,156

[22] Filed: Sep. 4, 1990

[51] Int. Cl.$^5$ ............................................. B60K 1/00
[52] U.S. Cl. .................... 180/65.1; 180/68.5; 180/907; 280/250.1
[58] Field of Search .................. 280/250.1; 180/68.5, 180/65.1, 65.2, 907; 105/51

[56] References Cited

U.S. PATENT DOCUMENTS

| | | | |
|---|---|---|---|
| 2,65,703 | 4/1953 | Goeller | 180/13 |
| 1,165,784 | 12/1915 | Klingelsmith | 180/65.1 |
| 2,798,565 | 7/1957 | Rosenthal et al. | 180/6.5 |
| 3,107,105 | 10/1963 | Heriford | 280/42 |
| 3,437,164 | 4/1969 | Rabjohn | 180/68.5 |
| 3,497,027 | 2/1970 | Wild | 180/65.4 |
| 3,613,813 | 10/1971 | Biddle | 180/6.5 |
| 3,708,028 | 1/1973 | Hafer | 180/65.1 |
| 3,889,773 | 6/1975 | Chant | 180/65.1 |
| 4,199,036 | 4/1980 | Wereb | 180/6.5 |
| 4,323,133 | 4/1982 | Williams | 180/65.1 |
| 4,436,320 | 3/1984 | Brudermann et al. | 280/250.1 |
| 4,512,613 | 4/1985 | Nassiri | 301/1 |
| 4,671,524 | 6/1987 | Haubenwallner | 280/212 |
| 4,756,978 | 7/1988 | Nitcher et al. | 429/1 |

FOREIGN PATENT DOCUMENTS

| | | | |
|---|---|---|---|
| 2315390 | 10/1973 | Fed. Rep. of Germany | 180/68.5 |
| 2134056 | 8/1984 | United Kingdom | 180/907 |
| 2192161 | 1/1988 | United Kingdom | 180/65.1 |

OTHER PUBLICATIONS

A-BEC Product Literature.
Falcon Rehabilitation Product Literature.
Folio Product Literature.
Kempf Product Literature.
Willhelm Meyer GmbH & Co. Product Literature.
Boden Rehab Ad Product Literature.
Everest & Jennings Product Literature.
Invicar Product Literature.
Fauteuils Electroniques Dupont Product Literature.
Global Research Limited Product Literature.
Twenty-First (21st) Century Scientific Inc. Product Literature.
Inter-med Incorporated Product Literature.
MK Battery Product Literature.

*Primary Examiner*—Eric D. Culbreth

[57] ABSTRACT

An economical light weight foldable wheelchair is selectively operable in a motorized, attendant or occupant driven self-propelled mode of operation. The wheelchair includes two opposed side frames that are foldable to a laterally more compact condition, a motor drive assembly and a foldable energy supply system support assembly. The energy supply system support assembly slidably receives two battery units with convenient front access and automatic electrical connection. Storage under the seat assures a center of gravity well ahead of the rear wheels. The motor drive system includes a releasable wheel drive assembly that supports two large rear wheels with a center of rotation behind, under or in front of the back support of the seat. Manual drive rings are mounted on the outside of the rear wheels and the occupant can easily reach a hub mounted toggle handle for the wheel drive assembly to control engagement of the rear wheels with the drive motors. An occupant may thus use the motor drive assembly or idsengage the drive motors and manually self-propel the wheelchair using the manual drive rings.

3 Claims, 5 Drawing Sheets

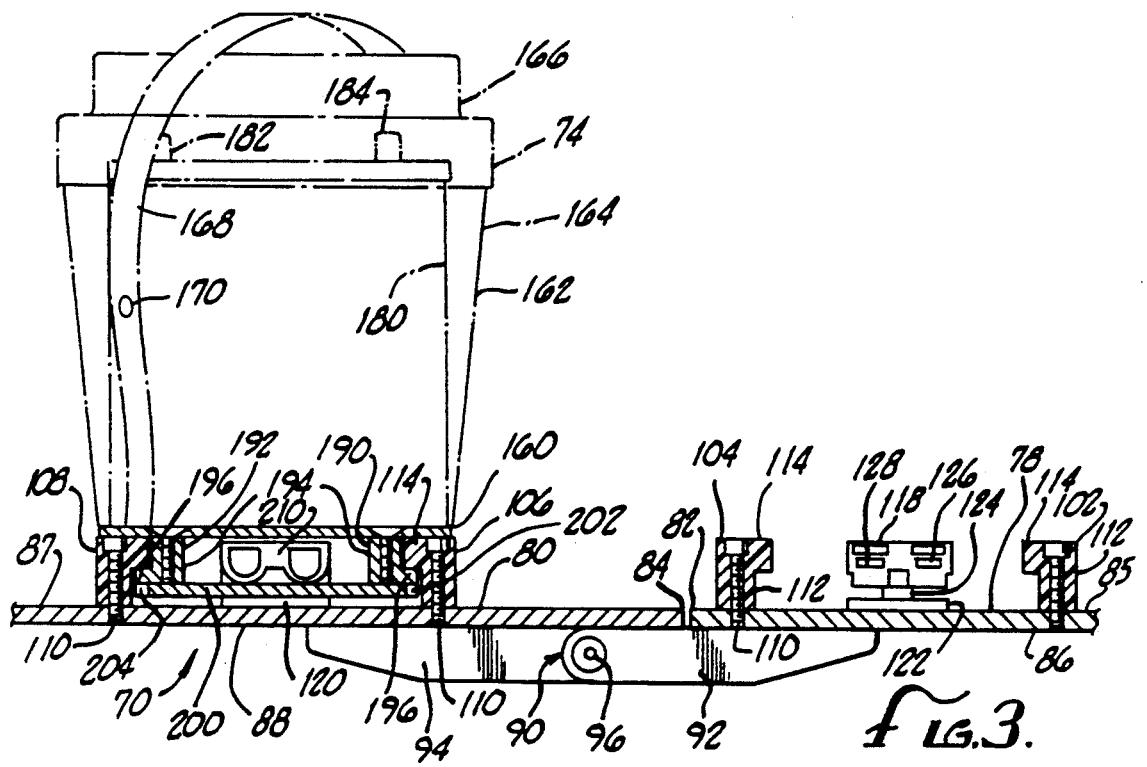
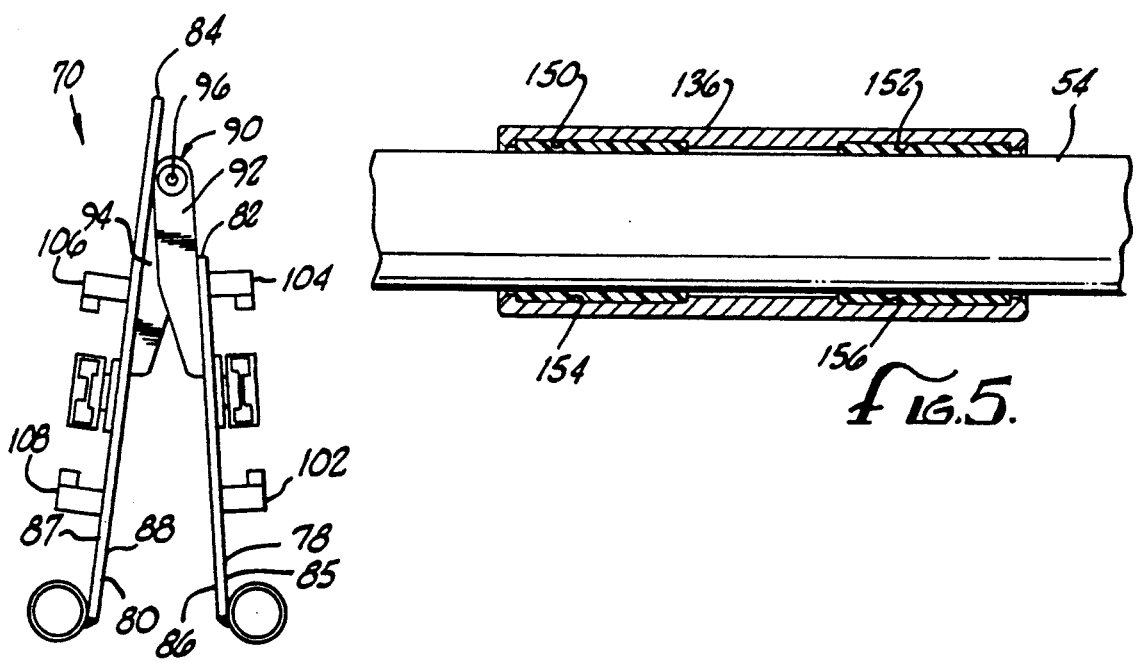

1

FOLDABLE WHEELCHAIR WITH OPTIONAL POWER OR MANUAL DRIVE

CROSS-REFERENCE TO RELATED APPLICATION

This application is being simultaneously filed with a commonly assigned application Ser. No. 07/578,587 for "WHEELCHAIR DRIVE ASSEMBLY".

BACKGROUND OF THE INVENTION

Over a period of many years power wheelchairs have been developed to increase the independence and mobility of handicapped people. While many advances have been made in the development of power wheelchairs, many problems remain. For example, insertion and removal of batteries is quite difficult for a disabled person. Typically the batteries must be removed from either the back or the side of a wheelchair. Frequently batteries must be removed for transportation or service. The heavy battery terminal wires must be removed before a battery is removed and then must be reconnected when a new battery is inserted. The process for inserting and removing the batteries may thus be quite difficult for a user of the wheelchair who does not have the strength to lift the batteries or the manual dexterity to easily make electrical connections by hand. The electrical connection between the battery and the controller/motor of the wheelchair also comprises an exposed wire which could loosen, corrode, or snag while the wheelchair is in use, possibly disabling the wheelchair and stranding the occupant.

The batteries are sufficiently heavy that they significantly affect the center of gravity of a wheelchair. This is particularly true when the batteries are located behind the seat. In order to provide adequate stability, it has usually been necessary to move the rear wheels rearward to a position behind the seat and thereby increase the length of the wheelbase. This makes the wheels very difficult to reach for manual propulsion of the wheelchair by an occupant. In addition, the rear drive wheels for motor driven wheelchairs are made smaller than conventional 22-26 inch diameter wheelchair wheels. In addition to placing the rear wheels out of the reach of the occupant, the larger wheelbase means that the wheelchair is less maneuverable.

Even if the occupant could reach the rear wheels to self propel the wheelchair, there would be no way for the occupant to disconnect the wheels from the drive motors. Manual self-propulsion of a motorized wheelchair by an occupant has thus been completely impractical.

Many examples of battery-powered wheelchairs may be found on the market. One such battery-powered wheelchair is foldable and has two batteries supported under the seat of the wheelchair on a foldable baseplate. The two batteries of the wheelchair must be removed from the side of the wheelchair and they must be removed together, that is, one of the batteries cannot be removed by itself. Insertion and removal of the batteries also requires that the wires which make the electrical connection between the batteries and the motor must be connected by hand. Furthermore, the rear wheels of the wheelchair are small and are not designed for the occupant of the wheelchair to be able to reach out and propel the wheelchair by hand when the motor is not energized. Thus, the wheelchair can only be propelled by another person who must push the wheelchair when the motor is not energized.

SUMMARY OF THE INVENTION

A foldable, portable motorized wheelchair in accordance with the invention may be either power driven or manually propelled by the occupant. The wheelchair includes opposed side frames supporting a seat having a back support between them. Also secured to the side frames are a motor drive system, a pair of rear wheels, a pair of castor mounted front wheels, a pair of footrests and a folding battery support assembly that supports two batteries beneath the seat with front access for removal and insertion of batteries.

The rear wheels are implemented as large, 24 inch diameter wheels with a center of rotation placed in front, under or behind the seat back support. A hand ring is mounted on the outside of the rear wheels and a manually operated quick release hub drive mechanism enables the wheelchair occupant to selectively disengage the rear wheels from the motor drive system. The wheelchair may thus be selectively operated as either a motorized battery powered wheelchair or as a manually self-propelled wheelchair.

The folding baseplate assembly supports the required battery or batteries beneath the seat and, when the batteries are removed, enables the wheelchair to be folded to a laterally more compact condition. When folded, the wheelchair may be stored or transported much like a conventional nonpowered wheelchair.

The battery support assembly includes a folding baseplate and battery units that are secured by slide rails to the baseplate. The support assembly provides the wheelchair occupant with convenient access to the batteries while mating slides and electrical connectors on the baseplate and battery units enable battery units to be easily slid into or out of automatic connection on the baseplate. All electrical connections are automatically made or broken by the mating electrical connectors and no separate wiring connections are required.

The quick release hub drive mechanism has a handle that is readily reached by a wheelchair occupant and selectively engages or disengages the rear wheels from the motors. Different, tactiley distinguishable surfaces are provided on opposite sides of the engagement control handle. This enables the wheelchair occupant to be able to detemine without visual observation whether a hub drive mechanism is in the engaged or disengaged position.

BRIEF DESCRIPTION OF THE DRAWINGS

A better understanding of the invention may be had from a consideration of the following Detailed Description, taken in conjunction with the accompanying drawings in which:

FIG. 3 is a cross-sectional end view of the base of the battery support assembly shown in FIG. 2 taken along lines 3—3;

FIG. 4 is a front view of a foldable base plate used in the support assembly shown in FIG. 2, the baseplate assembly being shown in a folded configuration;

FIG. 5 is a cross-sectional view of a pivotable bearing connection between a wheelchair frame and the foldable baseplate shown in FIG. 4;

DETAILED DESCRIPTION OF THE PREFERRED EMBODIMENT

Figure 1:
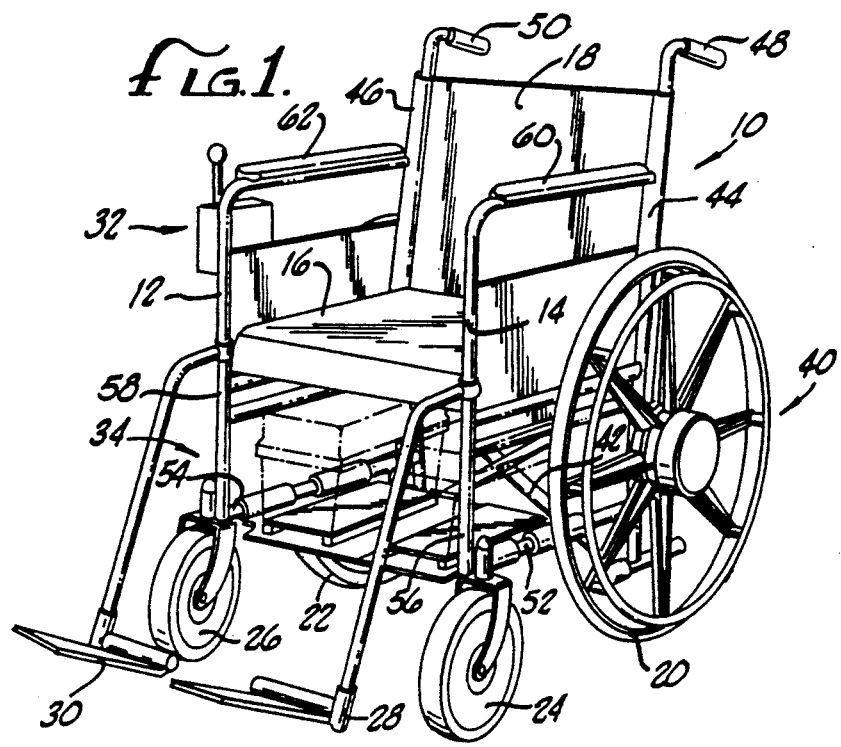
FIG. 1 is a simplified perspective view of a selectively power driven or occupant self propelled wheelchair in accordance with a preferred embodiment of the invention.
Figure 2:
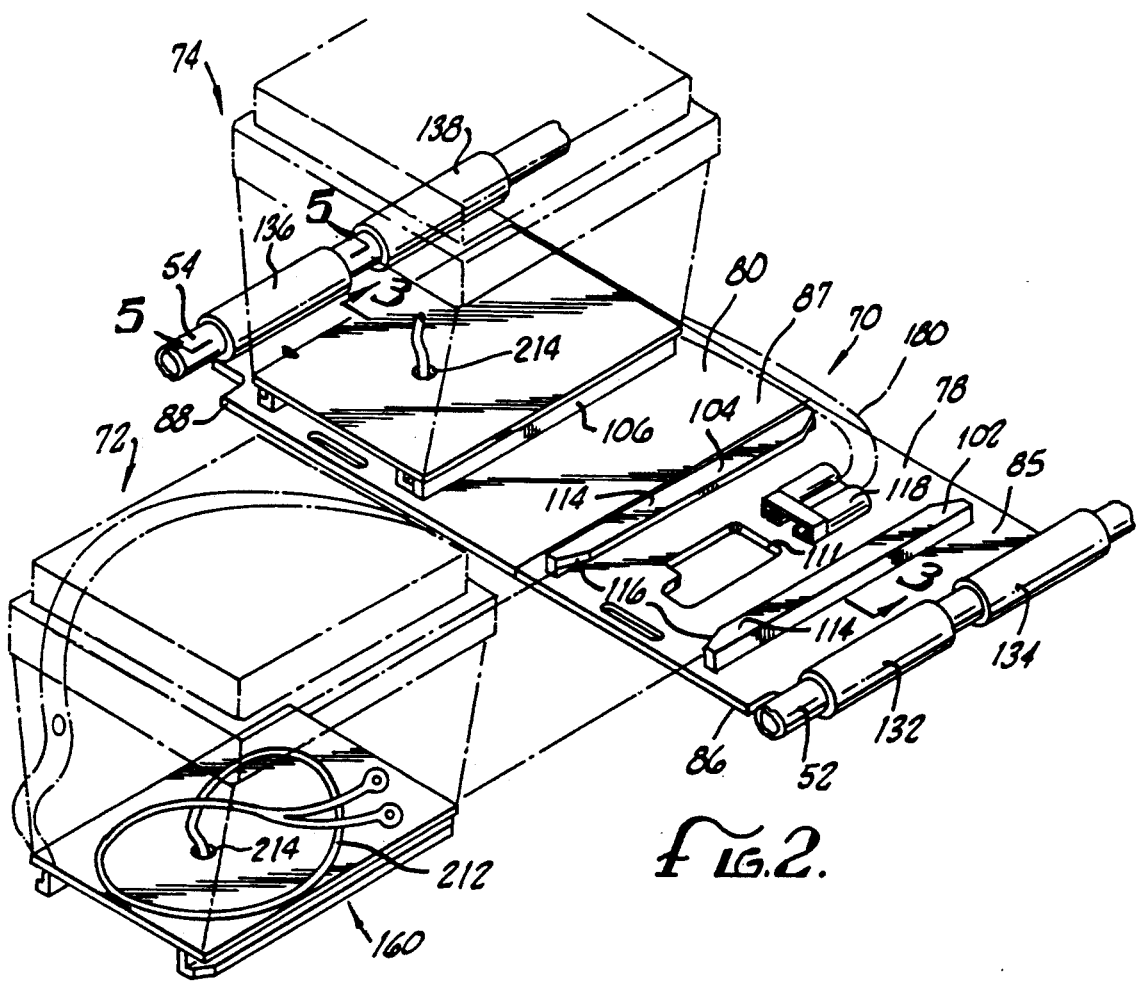
FIG. 2 is a partly phantom perspective view of a battery support assembly used in the wheelchair shown in FIG. 1.
Figure 6:
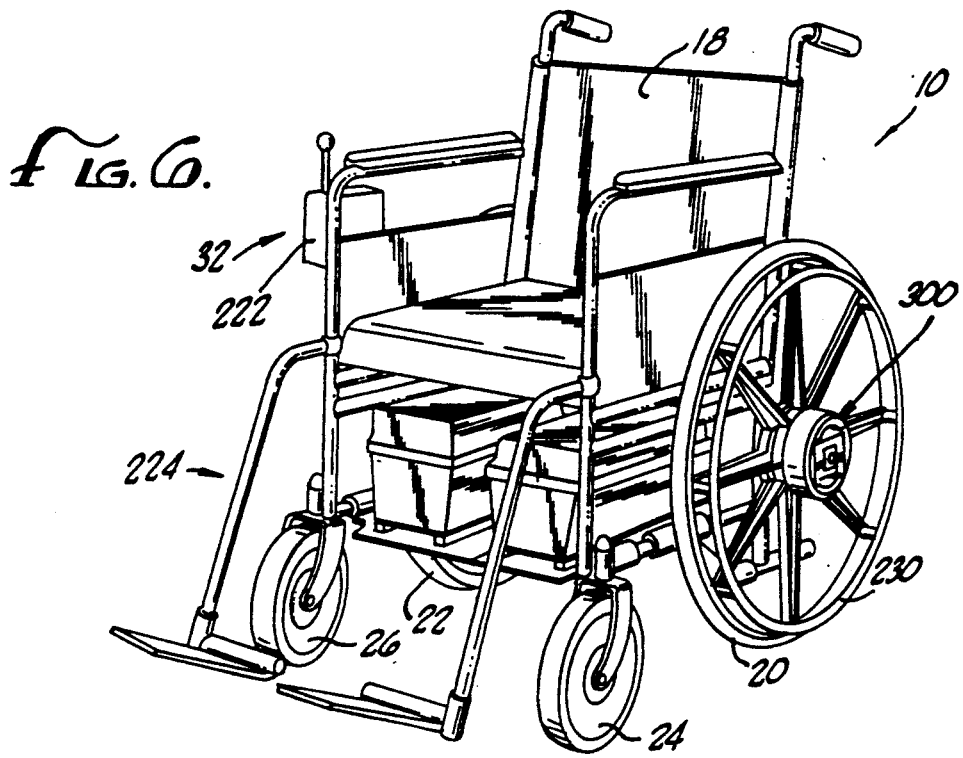
FIG. 6 is a perspective view of a wheelchair showing a releasable wheel drive assembly in accordance with the invention.

Referring now to FIG. 1, a foldable, selectively power driven or manually self propelled wheelchair 10 in accordance with the invention includes opposed right and left side frames 12, 14 providing the primary structural support for wheelchair 10. A seat 16 having a back support 18 extends between frames 12, 14 to support a wheelchair occupant (not shown). Also supported by the frames 12, 14 are left and right rear wheels 20, 22, left and right castor mounted front wheels 24, 26, left and right foot supports 28, 30, a motor drive system 32 and an energy supply system in the form of a battery support assembly 34. The rear wheels 20, 22 are identically mounted on a frame 10 by a selectively releasable hub drive mechanism 40 as illustratively shown for rear wheel 20.

The wheelchair side frames 12, 14 are made primarily of strong, lightweight tubing of a metal such as aluminum or steel alloy. The side frames are connected by a foldable supporting structure 42. The side frames 12, 14 include a pair of vertically extending members 44, 46 which support seat back 18 between them and also support a pair of rearwardly extending handles 48, 50. The side frames 12, 14 further include longitudinally extending tubular members 52, 54 which support assembly 34. Front vertical frame members 56, 58 extend upwardly from longitudinal frame members 52, 54. The seat 16 is either removable or foldable to allow the wheelchair 10 to be folded to a more laterally compact condition.

Referring now to FIGS. 2-5 the battery support assembly 34 includes a foldable baseplate assembly 70 and energy supply units in the form of battery units or batteries 72, 74. The foldable baseplate assembly 70 includes two coplanar support plates 78, 80 mounted in side-by-side relationship with opposed, abutting edges 82, 84 extending in a longitudinal direction. Plate 78 has a planar top surface 85 and a planar bottom surface 85, while plate 80 has a planar top surface 87 and a planar bottom surface 88.

Affixed to the bottom surfaces 86, 88 are a pair of longitudinally spaced identical hinges 90 (only the front most hinge being visible in the figures). The hinges 90 each have first and second hinge members 92, 94 which are pivotally jointed at a pivot point 96 in a conventional manner. First hinge member 92A is secured by welding or other suitable means to bottom surface 86 of plate 78 while a second hinge member 94 is secured to bottom surface 88 of plate 80.

Plate 80 may be wider than plate 78 so that abutting edges 82, 84 meet at a location distanced from the pivot point 96 and to the right thereof as viewed looking rearward in FIGS. 1-4. As a result, the plates 78, 80 are free to fold with the center pivot point 96 moving upward and the bottom surfaces 86, 88 moving toward each end, facing relationship, moving toward a parallel configuration. As the plates 78, 80 are unfolded and reach a side-by-side coplanar relationship, the hinge member 92 comes into engagement with bottom surface 88 of plate 80 and serves as a stop to prevent further unfolding of plates 78, 80. A stable firm flat battery support base is thus formed by plates 78, 80 when they are unfolded to their coplanar relationship.

Two longitudinally extending pairs of rails 102, 104 and 106, 108 are secured to the top surface 85, 87 of plates 78, 80 by screws 110, welding or other suitable means. The hinges 90 and hinge members 92, 90 operate as braces to help strengthen the support plates 78, 80. The plates can thus be made of thinner, lighter material and can have material removed at a central region to further reduce weight. Each rail includes a vertically extending bar portion 112 and a horizontally extending bar portion 114 which is cantilevered atop the vertical bar portion 112 and extends horizontally inward toward the other rail of the pair to form an inverted L-shape. The outer rails 102, 108 are positioned approximately $\frac{3}{8}$ inch longitudinally farther forward than the inner rails 104, 106. This simplified the insertion of battery units 72, 74 by allowing the outer rails 102, 108 to first be aligned, with the inner rails 104, 106 subsequently being aligned. The front edges 116 of horizontal bar members 114 are chamfered to further facilitate alignment of a battery unit 72 or 74 with the rails during insertion.

A pair of drive system electrical connectors 118, 120 are secured to the top surfaces 85, 87 proximate the pairs of rails 112, 114 and 116, 118. More particularly the connectors 118, 120 are secured midway between the respective pairs of rails 102, 104 and 106, 108 with a longitudinal position rearward of the halfway position. The connectors 118, 120 couple electrical power to the motor drive system 32. A spacer bar 122 and spacer washer 124 provide proper height adjustment of connector 118 above surface 82.

The electrical connectors 118, 120 each have two internal flat planar contacts 126, 128. The contacts 126, 128 are secured at the rear thereof to the body of the connector as well as to wires 180 and extend longitudinally forward to enable secure engagement with mating contacts on the battery units 72, 74.

Two pairs of pivot bearings 132, 134 and 136, 138 are welded to the opposite lateral extremities of the plates 78, 80, distanced from edges 82, 84 to pivotally secure the baseplate assembly to the sideframe longitudinally extending members 52, 54. The wheelchair 10 can thus be folded to a laterally more compact condition. With the battery units 72, 74 removed, the abutting edges 82, 84 can rise as they pivot about pivot point 96 of hinge 90.

As representatively illustrated in FIG. 5 for pivot bearing 136, each of the pivot bearings 132, 134, 136, 138 is generally cylindrical in shape and has two end regions with internal enlarged bores 150, 152. Bores 150, 152 receive low friction plastic bearing inserts 154, 156 to prevent binding as the pivot bearing 136 is rotated relative to longitudinal side frame member 54. A small gap (not shown) in the circumference of cylindrical inserts 154, 156 enable them to be positioned at the enlarged bores 150, 152 and then expanded to mate therewith.

The battery units 72, 74 may be identical and, as represented by unit 74, include a bottom plate 160 supporting a battery housing 162 having a container portion 164 and a lid portion 166. A strap 168 forms a first loop as it extends from between bottom plate 160 and housing 162 at the left front of the battery unit 74 to a fastener 170 on a front wall of container 164. A second, larger loop is formed as strap 168 extends from fastener 170 diagonally over the top of battery unit 74 to securement between housing 162 and bottom plate 160 at the lower right rear of housing 162 (as viewed in FIG. 3). The first loop thus provides a convenient handle for sliding battery unit 74 in and out of position on support plate 80 while the second loop provides a convenient carrying handle. A battery 180 having positive and negative terminals 182, 184 is disposed within housing 162.

Battery unit 74 further includes a pair of longitudinally extending L-shaped rails 190, 192 secured to a bottom surface of bottom plate 160. Rails 190, 192 each have a vertical bar 194 extending downward from the bottom of plate 160 and a cantilevered horizontally extending bar 196 which extends horizontally outward away from the rail in the pair 190, 192 a short distance.

The rails 190, 192 are laterally spaced to fit just inside of a pair of rails 102, 104 or 106, 108 to form a secured, longitudinally slidable mating relationship with rail 106, 108 on support plate 80, as seen in FIG. 3. Horizontal bar 196 slides beneath horizontal bar 114 to assure that battery unit 74 is securely retained in place on support plate 80. The rails 190, 192 and 116, 118 thus form a slide assembly having mating pairs of slides that provide convenient insertion and removal of the battery units 74 with access through the front of the wheelchair 10.

A cross plate 200 is longitudinally positioned approximately midway along rails 190, 192 at a pair of recesses 202, 204 and extends laterally between the rails 190, 192. Cross plate 200 supports a two contact battery side electrical connector 210 which is shaped to matingly engage and make electrical contact with the drive system electrical connectors 118, 120.

Connector 210 also connects with a wire set 212 (see FIG. 2) which passes through a hole 214 in bottom plate 160 to provide electrical connection to battery terminals 182, 184. Battery unit 74 may thus be removed from or inserted into wheelchair 10 with no need to make a separate connection to the battery terminals 182, 184. Electrical connector 210 remains connected to the terminals and as it mates with connector 120 during insertion a full electrical circuit is automatically completed from battery 180 to controller/motor drive system 32. The need for the wheelchair occupant or other person to deal with the battery connections upon inserting or removing a battery unit 72, 74 is eliminated.

In addition to being laterally foldable in a manner similar to a conventional nonmotorized wheelchair, foldable wheelchair 10 can selectively be operated in a motorized mode or in a manual propelled mode. An assistant can of course use handles 48, 50 to propel wheelchair 10 from the rear as well.

Making reference now to FIGS. 6-11, the motor drive system 32 includes a manual joy stick controller 222 receiving energy from an energy supply system and two motors 226, 228 (see, for example, FIG. 11) independently driving the rear wheels 20, 22 in response to manipulation of the joy stick controller 222.

The front wheels 24, 26 are castor mounted and have no independent steering capability. They are passively responsive to the steering motion of the wheelchair 10. Steering may thus be completely controlled through the independent motion of rear wheels 20, 22.

Occupant manual propulsion of wheelchair 10 is enabled by providing large, 24 inch diameter rear wheels 20, 22 by providing a center of rotation for wheels 20, 22 at, in front, under or behind the seat back support 18, by mounting a manual propulsion or drive ring 230 on the outside of wheels 20, 22 and by coupling the wheels 20, 22 to their respective drive motors 226, 228 through a manually releasable hub assembly 300. When hub assembly 300 is disengaged the associated rear wheel 20, 22 of wheelchair 10 is completely disconnected from drive motors 226, 228.

A separate hub assembly 300 connects each drive motor 226, 228 to its associated rear wheel 20, 22 respectively. Thus, while only the hub assembly 300 coupling motor 226 to rear wheel 20 is illustrated and described in detail, it will be appreciated that a substantially identical hub assembly connects drive motor 228 to rear wheel 22.

Figure 7:
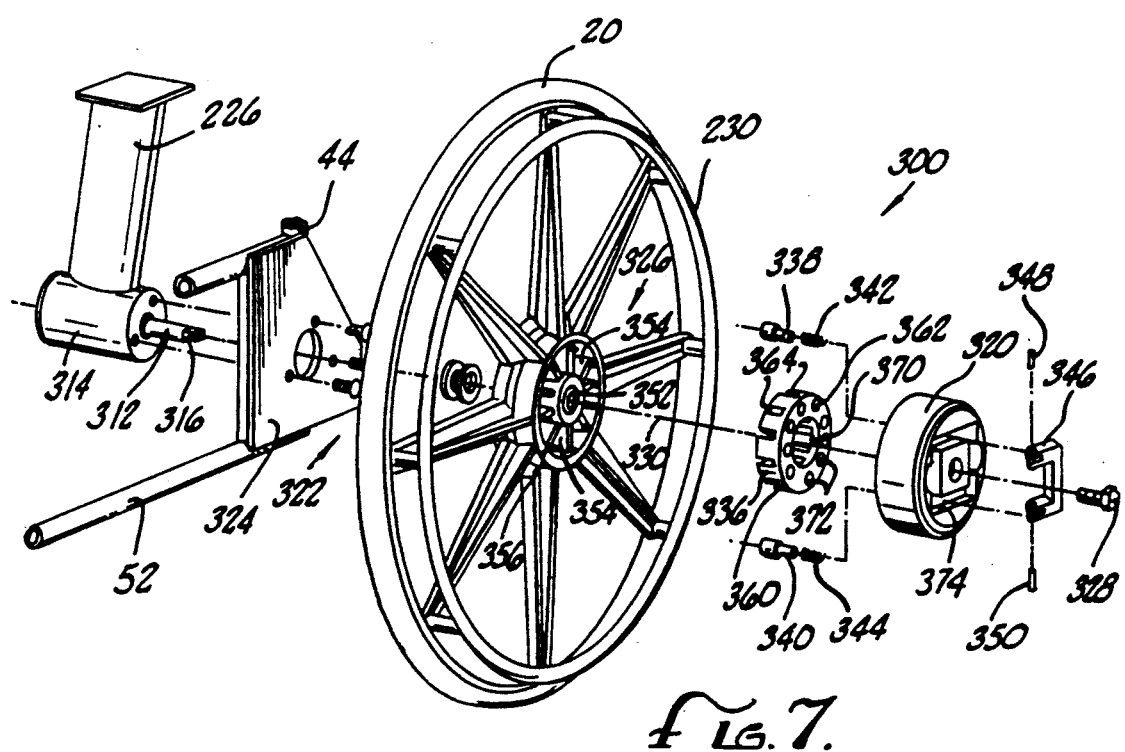
FIG. 7 is an exploded perspective view of the releasable wheel drive assembly in accordance with the invention.
Figures 8, 9:
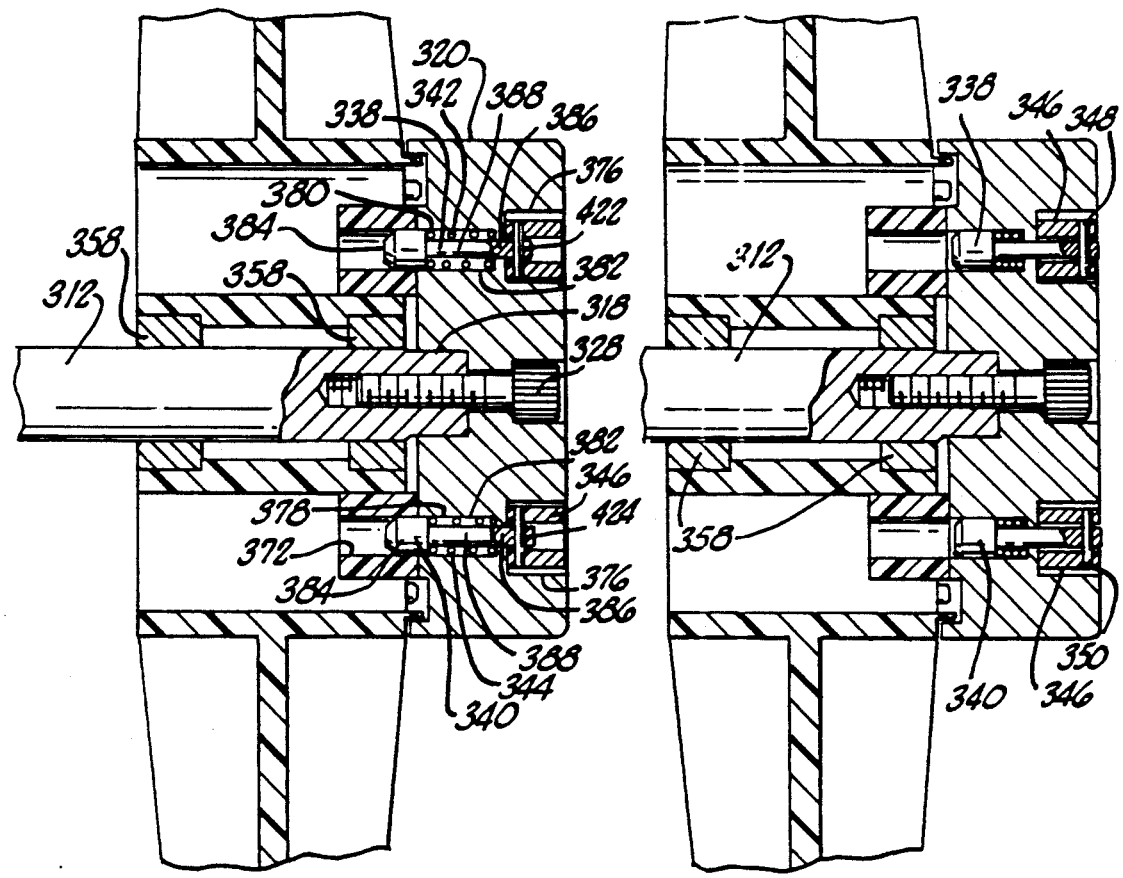
FIG. 8 is a cross sectional view of the wheel drive assembly shown in FIG. 7 with locking pins in an engaged position.
FIG. 9 is a cross sectional view of the wheel drive assembly shown in FIG. 7 with locking pins in a disengaged position.
Figures 10A, 10B:
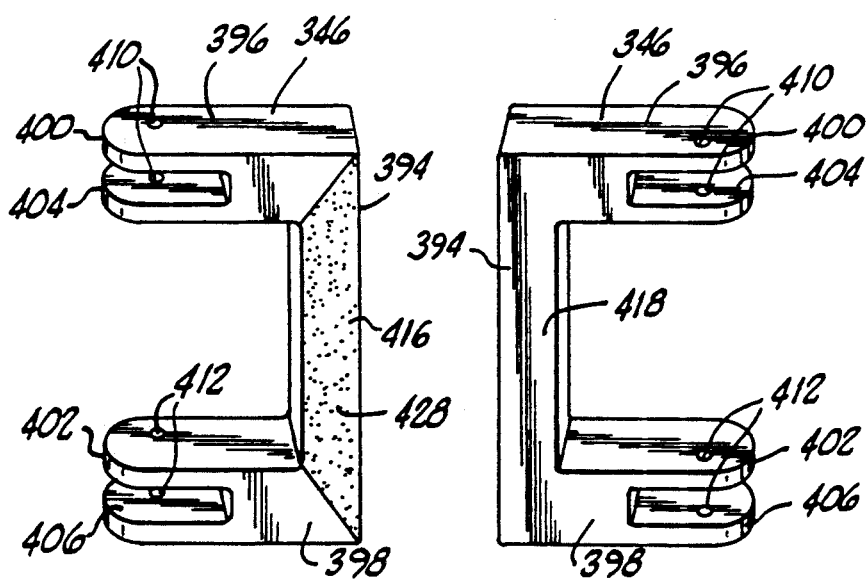
FIG. 10a is a front perspective view of a U-shaped toggle handle used in the releasable wheel drive assembly shown in FIG. 7.
FIG. 10b is a rear perspective view of a U-shaped toggle handle used in the releasable wheel drive assembly shown in FIG. 7.
Figure 11:
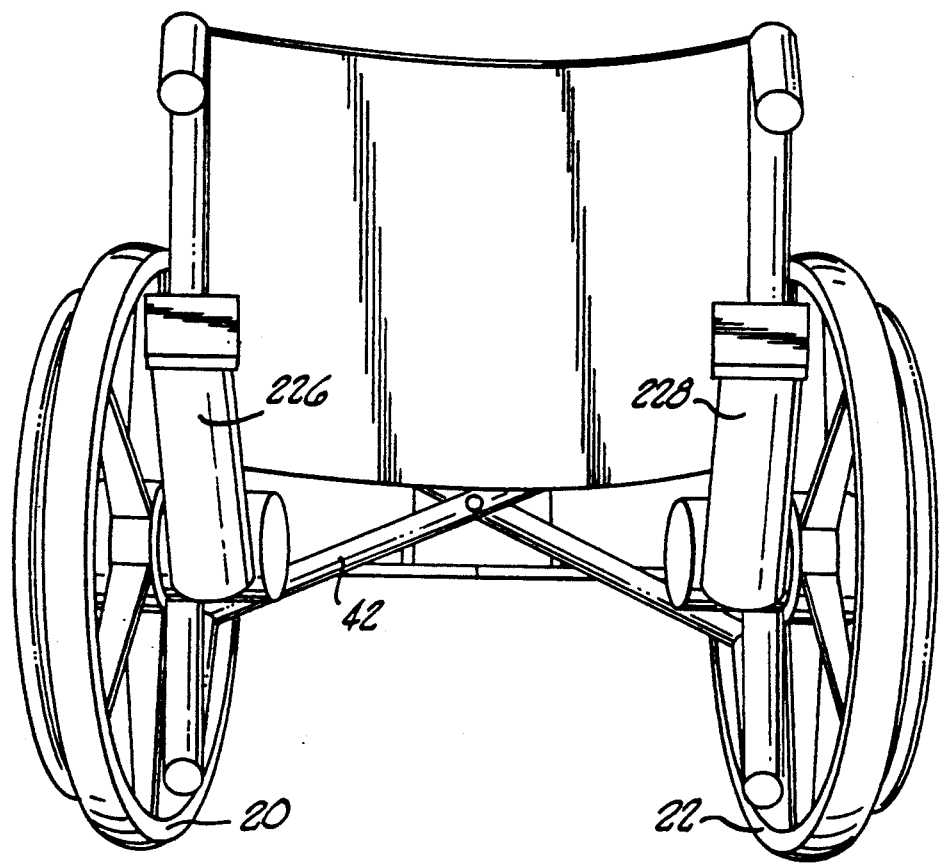
FIG. 11 is a simplified rear perspective view of a power driven wheelchair in accordance with the invention with the battery support assembly removed.

As seen, for example, in FIG. 7, hub assembly 300 includes a drive axle 312 having an inner driven end permanently coupled through an axially extending worm gear assembly 314 to motor 226 which has an axis of rotation extending parallel to drive axle 312. While most of drive axle 312 is cylindrical in shape, an opposite, free end 316 of drive axle 312 has a square shape and is received in mating relationship by an axially or laterally extending square aperture 318 in a generally cylindrical drive hub 320. This condition is best seen in FIGS. 8 and 9. The square shapes of end 316 and aperture 318 serve as a key to prevent relative rotation between shaft 312 and drive hub 320. A bolt 328 secures drive hub 320 to free end 316 of drive axle 312.

Worm gear assembly 314 and correspondingly shaft 312 carried thereby are mounted by bolts 322 to a metal plate 324 which forms part of side frame 14 and is positioned longitudinally in front of vertical member 44, which supports seat back support 18. Drive axle 312 receives and rotationally supports a central hub 326 of rear wheel 20 laterally outside of side frame 14. The central axis 330 about which wheel 20 rotates is thus positioned longitudinally forward of seat back support 18. In this position a wheelchair occupant can conveniently reach the center of wheels 20, 22 to toggle releasable hub assembly 300 between states of engagement and disengagement. The occupant can also conveniently reach the hand rail 230 to manually self propel and guide wheelchair 10.

In addition to drive hub 320 the other elements of releasable hub assembly 300 include a spider 336 which engages central hub 326, a pair of locking pins 338, 340, a pair of springs 342, 344, a toggle handle 346, and a pair of pivot pins 348, 350 for pivotally securing handle 346 to the locking pins 338, 340.

Central hub 326 is preferably made of plastic and has a cylindrical center hub 352 that is connected by multiple radial spokes 354 to a cylindrical middle hub 356. Bearings 358 rotationally mount center hub 352 and hence wheel 20 on drive axle 312, Spider 326 is a generally cup-shaped member having a generally cylindrical sidewall 360 and a disk-shaped end wall 362 affixed thereto. Sidewall 360 has multiple axial slots 364 which mate with spokes 354 as spider 326 is slid into engagement with central hub 326. The engagement between spokes 354 and slots 364 precludes relative rotation between spider 336 and central hub 326 of wheel 20.

The end wall 362 of spider 336 has a large central bore 370 that concentrically mounts over center hub 352 and receives drive axle 312 and multiple axially extending, circumferentially spaced, diametrically opposed pairs of locking pin holes 372 distributed at equal radii about central axis 330. Spider 336 is made of metal with hardened bushings forming locking pin receptacles 372 that can receive locking pins 338, 340 without sustaining damage that might be inflicted if locking pins 338, 340 were allowed to directly engage the plastic central hub 326.

Drive hub 320 is a generally cylindrical member having a laterally outward facing circular end surface 374 having a rectangular shaped slot or groove 376 defined therein to a depth of about 154 inch. A pair of locking pin bores 378, 380 extend axially through drive hub 320 at radial positions matching the radial positions of locking pin bores 372 in spider 336. Bores 378, 380 each have a large diameter section 382 that mates with and guides the large diameter laterally inward locking end 384 of locking pins 338, 340 and a small diameter section 386 that matingly receives a small diameter shank portion 388 of locking pins 338, 340. The springs 342, 344 are inserted in the bores 380, 378 ahead of locking pins 338, 340 and thus tend to force locking pins 348, 350 laterally inward toward spider 336.

Handle 346 is a generally U-shaped member having a cross bar 394 with two oppositely positioned, parallel side bars 396, 398 extending therefrom. The side bars 396, 398 terminate in ends 400, 402 having slots 404, 406 adapted to receive the outward ends of shank portions 388 of respective locking pins 338, 340.

A pair of transverse bores 410, 412 pass through the ends 400, 402 of side bars 396, 398 in a direction parallel to cross bar 394. Handle 346 has first and second opposed parallel planar side surfaces 416, 418. Bores 410, 412 are located eccentrically with respect to these side surfaces 416, 418 and also with respect to ends 400 402 to enable the axial positioning of locking pins 338, 340.

The shanks 388 of locking pins 338, 340 are sufficiently long relative to the depth of a large diameter section 382 of bores 378, 380 and the thickness of drive hub 320 that they may be forced laterally outward to a position wherein transverse pivot pin bores 422, 424 located near the ends thereof extend beyond the outer surface of drive hub 320. From this position the ends 400, 402 of handle 346 can be joined with the shank ends of locking pins 348, 350 with the ends being received into slots 404, 406 such that bores 422, 424 may be axially aligned with the bores 410, 412 in handle 346. With the bores thus aligned pivot pin 348 may be inserted into bores 422 and 410 to pivotally attach locking pin 338 to handle side member 396 and pivot pin 350 may be inserted into bores 424 and 412 to pivotally attach locking pin 340 to hand side member 398. With the locking pins 338, 340 thus attached to handle 346 they may be released to allow springs 342, 344 to force handle ends 400, 402 axially inwardly into rectangular groove 376. The sidewalls of groove 376 then serve to restrain pivot pins 348, 350 to maintain the assembled arrangement.

The bores 410, 412 are eccentrically located closer to second surface 418 than first surface 416 and closer to first surface 416 than to ends 400, 402. Handle 346 may thus be toggled by rotation between two stable positions 180 degrees apart. The two surfaces 416, 418 are made tactilely distinguishable by roughening surface 416 at area 428, by defining letters in one of the surfaces or by means of some other technique which allows a wheelchair occupant to determine the toggle state of handle 346 simply by touching the handle surface and without visual inspection. The occupant may thus be able to readily determine whether or not the rear wheel hubs are engaged or disengaged.

When handle 346 is rotated to the position wherein first surface 416 faces outward as shown in FIG. 8, the locking pins 338, 340 are released so as to be forced by springs 342, 344 toward the spider 336. When the wheels are rotated so that the pins 338, 340 become aligned with a pair of locking pin bores 372 the pins move axially inward to enter the bore 372 and rotationally lock the rear wheel 20 or 22 to drive hub 320 and hence to drive system 32. In this position the occupant can feel the roughened area 428 to confirm the engaged condition.

When handle 346 is toggled 180 degrees to the engagement stable condition as shown in FIG. 9, the locking pins 338, 340 are lifted from the bores 372 in spider 320 to allow rear wheel 20 to turn freely relative to drive hub 320. In this position, the wheel chair occupant can feel the smooth side 418 of handle 346. Wheelchair 10 can be manually guided and propelled without encountering any drag from the drive motors 226, 228.

While there has been shown and described above a particular arrangement of a foldable, selectively motor driven or self propelled wheelchair in accordance with the invention for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. A foldable motor driven wheelchair comprising:
   a first and a second side frame, parallel to each other and extending in vertical and longitudinal directions;
   a foldable seat carried by and extending transversely between the side frames;
   a supporting structure connecting the side frames for motion between an unfolded position in which the side frames are spaced sufficiently apart to accommodate an occupant with the seat unfolded thereunder and a folded position in which the side frames are relatively closer together in side-by-side relation with the seat folded therebetween;
   a motor controller supported on at least one of said side frames;
   at least one electric motor supported by at least one of the side frames and electrically coupled to the motor controller;
   a foldable baseplate pivotably connected to and extending between the wheelchair side frames wherein said foldable baseplate includes a first plate and a second plate movably connected to each other by a hinge assembly having a pivot point and at least one first hinge member and at least one second hinge member extending outward from said pivot plant, wherein said at least one first hinge member is attached to said first plate and said at least one second hinge member is attached to said second plate;

means of mechanically affixing said removable battery unit to said foldable baseplate;

means attached to said foldable baseplate of electrically connecting said removable battery unit to said motor controller;

wherein said first plate, having a first and a second longitudinal edge, said first longitudinal edge terminating at said first side frame and said second longitudinal edge terminating at a location between said hinge assembly and said second side frame and said second plate, having a first and a second longitudinal edge, said first longitudinal edge terminating at said second side frame and said second longitudinal edge terminating at a location between said hinge assembly and said second said frame; and wherein, when the wheelchair is in the unfolded position, said baseplate is positioned sufficiently beneath the seat to permit at least on removable battery unit to be accommodated between said baseplate and the seat, said hinge assembly is in a first position and said first and said second plates are longitudinally adjacent to each other, and wherein, when the wheelchair is in the folded position and said removable battery unit is removed, said hinge assembly is moved to a second position located relatively above said first position and said first and said second plates are moved to an angle relative to each other, approaching parallel positions in longitudinal planes.

2. A foldable motor driven wheelchair according to claim 1 wherein said second longitudinal edge of said first plate and said second longitudinal edge of said second plate are in proximity to each other.

3. A foldable motor driven wheelchair comprising:

a first and a second side frame, parallel to each other and extending in vertical and longitudinal directions;

a foldable seat carried by and extending transversely between the side frames;

a supporting structure connecting the side frames for motion between an unfolded position in which the side frames are spaced sufficiently apart to accommodate an occupant with the seat unfolded thereunder and a folded position in which the side frames are relatively closer together in side-by-side relation with the seat folded therebetween;

a motor controller supported on at least one of said side frames;

at least one electric motor supported by at least one of the side frames and electrically coupled to the motor controller;

a foldable baseplate pivotably connected to and extending between the wheelchair side frames wherein said foldable baseplate includes a first plate and a second plate movably connected to each other by a hinge assembly having a pivot point and at least one first hinge member and at least one second hinge member extending outward from said pivot point, wherein said at least one first hinge member is attached to said first plate and said at least one second hinge member is attached to said second plate;

means of mechanically affixing said removable battery unit to said foldable baseplate;

means attached to said foldable baseplate of electrically connecting said removably battery unit to said motor controller;

further comprising means for selecting between manual and motor driven propulsion of said wheelchair;

wherein said selecting means includes a handle pivotably mounted on a drive hub which engages a wheel of said wheelchair to said electric motor for motor driven operation and disengages said wheel for manual operation when the handle is pivoted from one position to another and locking pins coupled to said handle engage and disengage a hub of said wheel, respectively; and wherein, when the wheelchair is in the unfolded position, said baseplate is positioned sufficiently beneath the seat to permit at least one removable battery unit to be accommodated between said baseplate and the seat, said hinge assembly is in a first position and said first and said second plates are longitudinally adjacent to each other, and wherein, when the wheelchair is in the folded position and said removable battery unit is removed, said hinge assembly is moved to a second position located relatively above said first position and said first and said second plates are moved to an angle relative to each other, approaching parallel positions in longitudinal planes.

* * * * *